US009141463B2

(12) United States Patent
Nishiyama

(10) Patent No.: US 9,141,463 B2
(45) Date of Patent: Sep. 22, 2015

(54) ERROR LOCATION SPECIFICATION METHOD, ERROR LOCATION SPECIFICATION APPARATUS AND COMPUTER-READABLE RECORDING MEDIUM IN WHICH ERROR LOCATION SPECIFICATION PROGRAM IS RECORDED

(71) Applicant: FUJITSU LIMITED, Kawasaki-shi, Kanagawa (JP)

(72) Inventor: Kimihiro Nishiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 186 days.

(21) Appl. No.: 13/886,354

(22) Filed: May 3, 2013

(65) Prior Publication Data

US 2013/0246855 A1 Sep. 19, 2013

Related U.S. Application Data

(63) Continuation of application No. PCT/JP2010/070193, filed on Nov. 12, 2010.

(51) Int. Cl.
G06F 11/00 (2006.01)
G06F 11/07 (2006.01)

(52) U.S. Cl.
CPC .......... *G06F 11/0793* (2013.01); *G06F 11/079* (2013.01); *G06F 11/0778* (2013.01)

(58) Field of Classification Search
None
See application file for complete search history.

(56) References Cited

U.S. PATENT DOCUMENTS 8,171,340 B2 * 5/2012 Molnar et al. ................... 714/26
2007/0088988 A1 * 4/2007 Gupta et al. .................... 714/48

FOREIGN PATENT DOCUMENTS

| JP | 4-205441 | 7/1992 |
| JP | 11-65898 | 3/1999 |
| JP | 2004-86278 | 3/2004 |
| JP | 2006-285519 | 10/2006 |
| JP | 2007-109238 | 4/2007 |

OTHER PUBLICATIONS

International Search Report, mailed in connection with PCT/JP2010/070193 and mailed Feb. 1, 2011.
PCIe® Base 2.1 Specification PCIe Card Electromechanical 2.0 Specification PCIe Mini Card Electromechanical 2.0 Specification, 2013, pp. 1-2, http://www.pcisig.com/specifications/pciexpress/base2/#b21.

* cited by examiner

*Primary Examiner* — Alford Kindred
*Assistant Examiner* — Jason Bryan
(74) *Attorney, Agent, or Firm* — Fujitsu Patent Center

(57) ABSTRACT

A method for specifying an error location by an information processing apparatus that includes a plurality of devices connected to each other through a transmission path includes deciding, when an interrupt is generated, whether the interrupt is a periodic interrupt or an error interrupt, and storing, where the generated interrupt is a periodic interrupt, history information of errors of each of the devices, but analyzing, where the generated interrupt is an error interrupt, the stored history information of errors of the devices to specify a suspect location of the error.

17 Claims, 12 Drawing Sheets

FIG. 8A  Suspect classification definition of own device

| 31 | 16 15 14 13 12 11 | 9 8 7 6 5 | 1 0 |
|---|---|---|---|
| RsvdZ | 1 | | RsvdZ |

34

FIG. 8B  Suspect classification definition of transmission path

| 31 | 16 15 14 13 12 11 | 9 8 7 6 5 | 1 0 |
|---|---|---|---|
| RsvdZ | 1 | 1 1 | RsvdZ |

34

FIG. 8C  Suspect classification definition of opposing device

| 31 | 16 15 14 13 12 11 | 9 8 7 6 5 | 1 0 |
|---|---|---|---|
| RsvdZ | | 1 | RsvdZ |

34

| Candidate location | Priority rank |
|---|---|
| Upstream device | 3 |
| Transmission path | 1 |
| Downstream device | 2 |

| Time stamp | Type of error | Suspect location | Priority rank | Error contents |
|---|---|---|---|---|
| Jun 7 11:19:54 | Error | SW0-P1_SW1-P0 PCIe Link | 1 | Surprise Down Error |
| Jun 7 11:19:54 | Error | SW1-P0 | 2 | Surprise Down Error |
| Jun 7 11:19:54 | Error | SW0-P1 | 3 | Surprise Down Error |

37

ERROR LOCATION SPECIFICATION METHOD, ERROR LOCATION SPECIFICATION APPARATUS AND COMPUTER-READABLE RECORDING MEDIUM IN WHICH ERROR LOCATION SPECIFICATION PROGRAM IS RECORDED

CROSS-REFERENCE TO RELATED APPLICATIONS

This application is a continuation application of International Application No. PCT/JP2010/070193, filed on Nov. 12, 2010, the entire contents of which are incorporated herein by reference.

FIELD

The embodiment discussed herein is directed to an error location specification method for an information processing apparatus and an error location specification apparatus. The embodiment discussed herein is directed also to a computer-readable recording medium in which an error location specification program for implementing the method and apparatus is recorded.

BACKGROUND

An information processing apparatus generally includes a central processing unit (hereinafter referred to as "CPU"). Some CPU includes a function for transiting to a system management mode (hereinafter referred to as "SMM") that is one of operation modes of the CPU by a kind of interrupt called system management interrupt (hereinafter referred to as "SMI"). As an example of a CPU that transits to the SMM, a CPU of the x86 architecture of Intel or a like architecture is available.

If an SMI is received, then the CPU transits to the SMM mode. In the SMM mode, the CPU executes an SMI handler. An SMI handler is a program for processing the SMI in a system management random access memory (hereinafter referred to as "SMRAM") space that is an independent address space in a memory space and cannot be accessed from any other operation mode.

If the processing of the SMI is completed, then the CPU restores the mode before the transition to the SMM.

The PCI Express (PCIe) is one standard for an I/O serial interface.

In a connection configuration of the PCIe, devices (ports) of the PCIe are connected to each other through a link of the PCIe. In detail, a root port of the PCIe and functions as a start point of the connection configuration, a PCIe switch for routing a packet between the PCIe ports and an endpoint such as a PCIe card positioned at a terminal end, which all exist in a chip set, are connected to each other through the link of the PCIe.

FIG. 12 schematically depicts an example of a connection of the PCIe. In the connection of the PCIe, as depicted in FIG. 12, an upstream device 101 near to the root port (or the CPU) and a downstream device 102 are connected to each other by a physical transmission path (hereinafter referred to as "transmission path") 103 such as a cable, a connector, a wiring line and so forth.

To specify, where an error occurs in such a PCIe connection as described above and the link of the PCIe is disconnected (hereinafter referred to as "link down"), a location (suspect location) at which an error occurs is referred to as "fault location process".

Here, as depicted in FIG. 12, the suspect location is one of three locations including the upstream device 101, downstream device 102 and transmission path 103.

In the fault location process, the contents of status registers 104 and 105 provided in the devices 104 and 105, respectively, are analyzed to specify a suspect location when a fault occurs. However, if a link down occurs, then the status register 105 of the device 102 on the downstream side with respect to the link down location cannot be acquired.

Thus, specification of a suspect location of the link down is carried out, for example, by mounting an apparatus for exclusive use on an information processing apparatus and then causing the fault to be reproduced. Therefore, at a site at which an information processing apparatus operates, a suspect location of the link down cannot be specified immediately.

Here, since the downstream device 102 is a PCIe device or a PCIe card connected through a cable, the downstream device 102 is in most cases exchanged readily in comparison with the upstream device 101. Since the downstream device 102 can be readily exchanged in this manner, the conventional fault location process takes a countermeasure assuming that the suspect location upon occurrence of the link down is the downstream device. Then, a procedure manual or the like is used to let the technical staff know well that there is the possibility even that the suspect location may be the upstream device or the transmission path different from the downstream device.

However, since some of the technical staff who attempts to cope with the fault at the site at which the information processing apparatus is operating does not necessarily have sufficient expertize skills or the working time is limited, the possibility of some other suspect location may not be able to be examined sufficiently.

Where the estimated suspect location is mistaken in such a situation as described above, the fault member incorrectly determined to be "normal" is not exchanged. Therefore, after the error is dealt with, an error may occur with a high degree of possibility. Further, even if an investigation of the causes is attempted with regard to a normal article which has been incorrectly determined as a fault article, since the article originally is normal, it is difficult to specify a cause of the error.

In this manner, the conventional technology has a subject that very much time and labor are required and besides expertize skills are required in order to specify and deal with a suspect location when a link down occurs.

SUMMARY

There is provided a method for specifying an error location by an information processing apparatus that includes a plurality of devices connected to each other through a transmission path includes deciding, when an interrupt is generated, whether the interrupt is a periodic interrupt or an error interrupt, and storing, where the generated interrupt is a periodic interrupt, history information of errors of each of the devices, but analyzing, where the generated interrupt is an error interrupt, the stored history information of errors of the devices to specify a suspect location of the error.

There is provided also an error location specification apparatus for an information processing apparatus that includes a plurality of devices connected to each other through a transmission path, the error location specification apparatus including an interrupt decision unit that decides, when an interrupt is generated, whether the interrupt is a periodic interrupt or an error interrupt, an error storage unit that stores, where the generated interrupt is a periodic interrupt, history information of errors of each of the devices, and an error location specification unit that analyzes, where the generated interrupt is an error interrupt, the history information of errors of the devices stored in the error storage unit to specify a suspect location of the error.

Further, there is provided a computer-readable recording medium in which an error location specification program for an information processing apparatus that includes a plurality of devices connected to each other through a transmission path is recorded, the error location specification program causing a computer to execute a process includes deciding, when an interrupt is generated, whether the interrupt is a periodic interrupt or an error interrupt; and storing, where the generated interrupt is a periodic interrupt, history information of errors of each of the devices; but analyzing, where the generated interrupt is an error interrupt, the stored history information of errors of the devices to specify a suspect location of the error.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIGS. 8A to 8C are views depicting an example of suspect classification definition information as an example of the embodiment;

FIG. 11 is a view depicting an example of error pointing out format information as an example of the embodiment.

DESCRIPTION OF EMBODIMENT

In the following, an embodiment relating to an error location specification method and an error location specification apparatus as an example of the embodiment is described with reference to the drawings.

Figure 1:
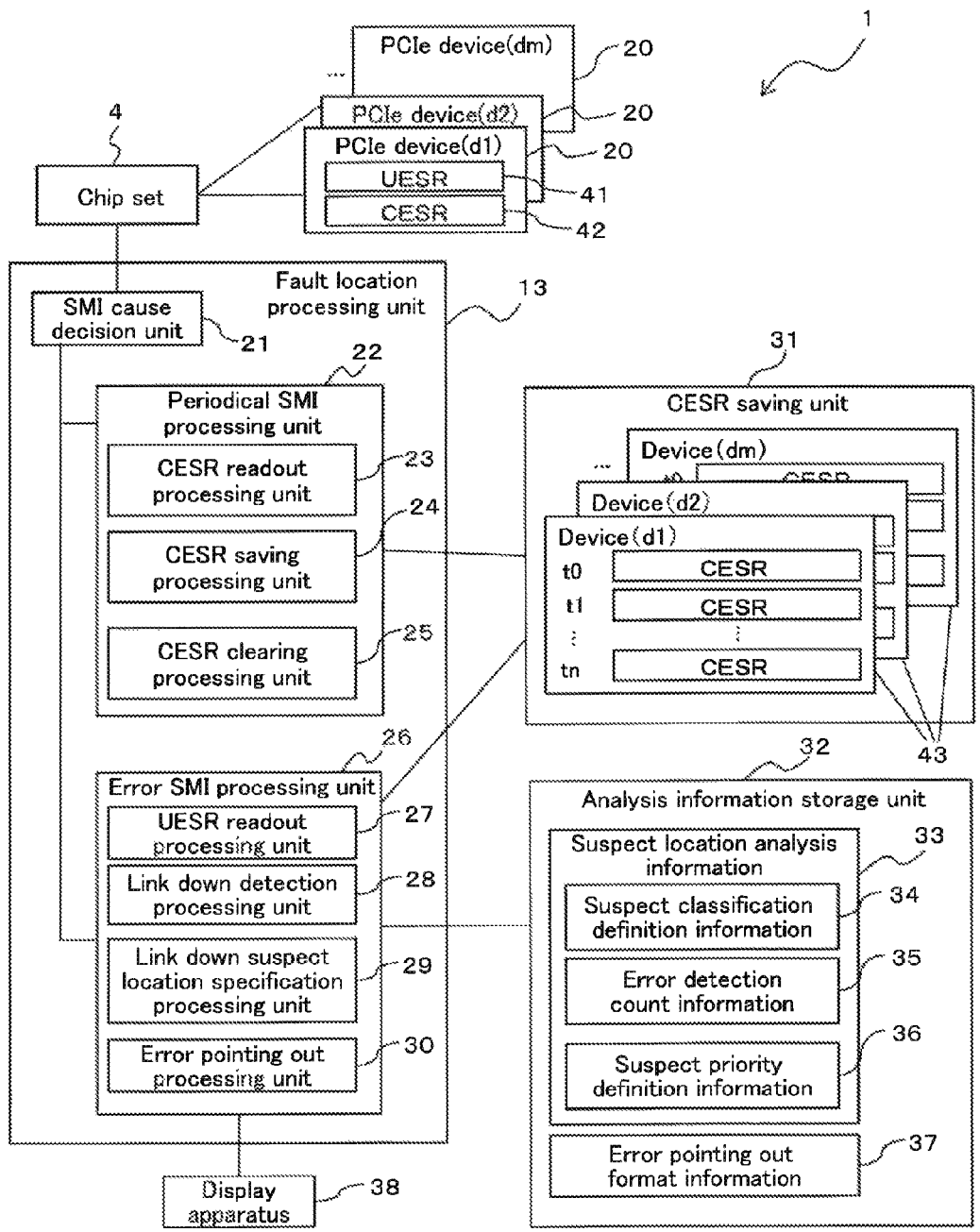
FIG. 1 is a block diagram depicting a functional configuration of a fault location processing unit as an example of an embodiment.
Figure 2:
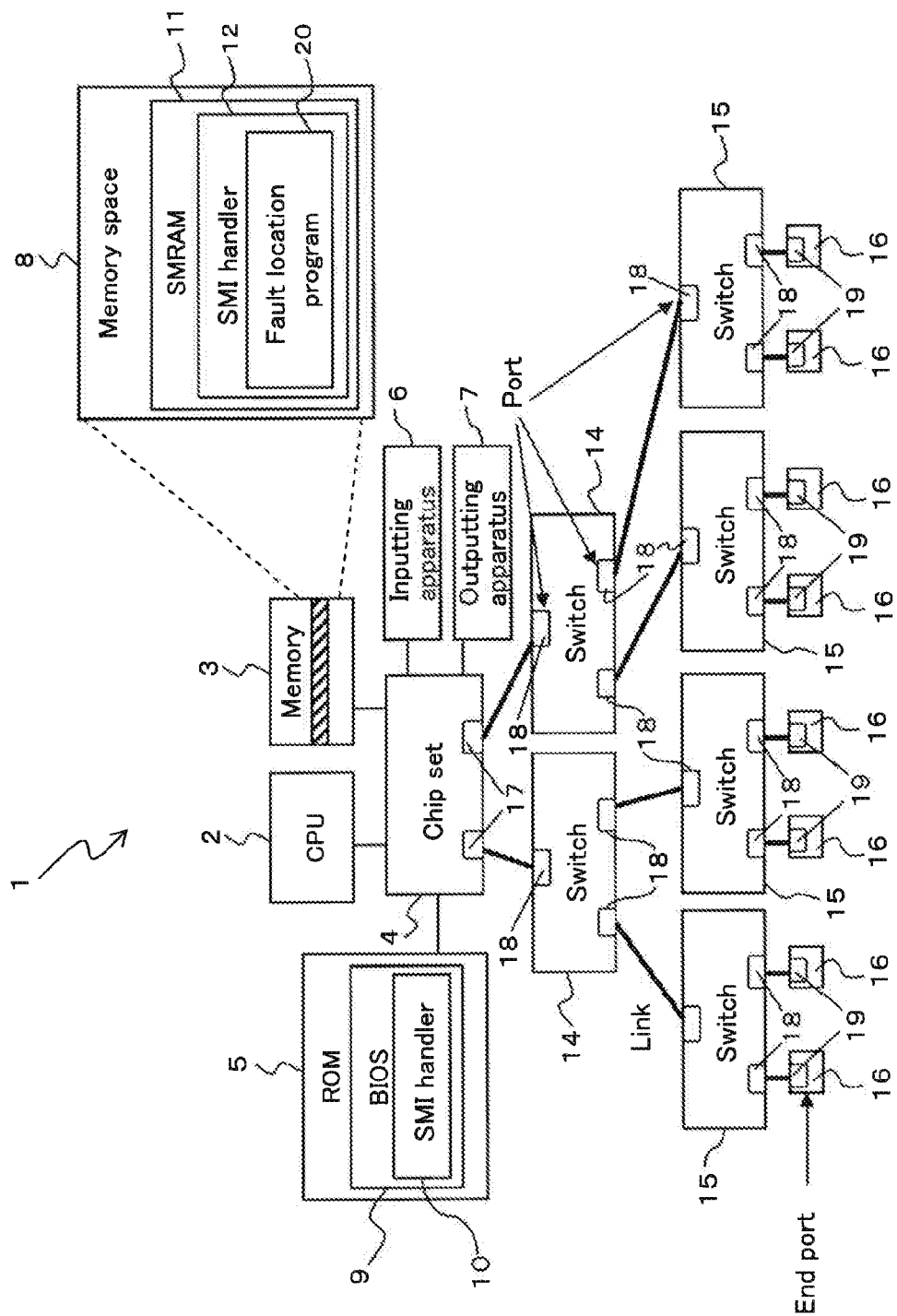
FIG. 2 is a block diagram schematically depicting a hardware configuration of an information processing apparatus as an example of the embodiment.

FIG. 1 is a block diagram depicting a functional configuration of a fault location processing unit 13 as an example of the embodiment, and FIG. 2 is a block diagram depicting a hardware configuration of an information processing apparatus 1 in which an error location specification method and an error location specification apparatus as an example of the embodiment are carried out.

The information processing apparatus 1 includes a CPU 2, a memory 3, a chip set 4, a ROM 5, an inputting apparatus 6 and an outputting apparatus 7. The chip set 4 is configured from a plurality of chips in which bus bridges and peripheral circuits are integrated. The CPU 2, memory 3, chip set 4, ROM 5, inputting apparatus 6 and outputting apparatus 7 are connected to each other through the chip set.

The chip set 4 includes not only a function for causing, when an unrecoverable error of the PCIe occurs, the CPU 2 to generate an SMI (error SMI) but also a function for causing the CPU 2 to generate an SMI (periodic SMI) after every fixed period of time. Further, the chip set 4 registers identification information into a register.

For example, in order to validate the error SMI function in the I/O Hub (IOH) of Intel, for an unrecoverable error of the PCIe, Severity=0 is set at bits 3 to 0 of the PCIe Error Severity Map Register of the Function=2, Offset=094h. Then, the System Error Event Map Register of the Function=2, Offset=09Ch is set so that an SMI is generated in response to an error (unrecoverable error) of Severity=0.

Further, for example, in order to create a periodic SMI function in the I/O Controller Hub10 (ICH10) of Intel, the PERIODIC_EN bit of the bit 14 of the SMI Control and Enable Register of the I/O address ACPI Base Address (PM-BASE)+30h is used for the setting.

It is to be noted that an apparatus different from that described above may be connected to the information processing apparatus 1. For example, a display apparatus (not depicted in FIG. 2) or a like apparatus is connected to the information processing apparatus 1.

Various programs to be executed by the information processing apparatus 1 are stored in the ROM 5. One of such stored programs as just described is the BIOS9 that is a program for carrying out inputting and outputting of the lowest level to and from hardware. Upon starting up of the information processing apparatus 1, the CPU 2 executes a program such as the BIOS9 stored in the ROM 5 utilizing the memory 3.

As described above, the CPU 2 is a processing unit for carrying out various kinds of calculation and control. The CPU 2 includes a function for transiting to the SMM by an SMI. Here, the SMM is one of operation modes of the CPU 2 introduced, for example, in the x86 architecture of Intel. If an SMI is received, then the CPU 2 transits to the SMM mode. In the SMM mode, the CPU 2 executes an SMI handler 10. The SMI handler 10 is a program for processing an SMI in an SMRAM space that is an independent address space in the memory space that cannot be accessed from any other operation mode. If the processing of the SMI is completed, then the CPU 2 restores the mode before the transition to the SMM.

In the example depicted in FIG. 2, in a connection of the PCIe, a root port 17 of the PCIe, PCIe switches 14 and 15 and an endpoint 16 are connected to each other through a link of the PCIe. In particular, two PCIe switches 14 are connected to the chip set 4 and two switches 15 are connected to each of the PCIe switches 14, and as a result, a tree-like multistage configuration in which the chip set 4 is the top is formed. The root port 17 of the PCIe exists in the chip set 4, and the chip set 4 includes one or more root ports 17 serving as a start point of a configuration. The PCIe switches 14 and 15 include one or more ports 18 for routing a packet between PCIe ports. The end point 16 is a PCIe card or the like positioned at a terminal end and includes a port 19. The port 17 and the port 18, the port 18 and the port 18, and the port 18 and the port 19 are connected to each other.

It is to be noted that, while the switches 14 and 15 in the example depicted in FIG. 2 are connected at two stages, the number of connection stages of the switches is not limited to two but may be one or three or more.

The root ports 17, ports 18, ports 19 and so forth which are devices of the PCIe (each of such devices is hereinafter referred to sometimes as "device") have a configuration space (memory space) for each of functions of the devices, and the memory spaces are used for accessing from software such as the BIOS9 to a function of the PCIe.

In the configuration space, for example, an unrecoverable error state register (uncorrectable error status register, hereinafter referred to as "UESR") 41 (refer to FIG. 3) indicating an unrecoverable error state, a recoverable error state register (correctable error status register, hereinafter referred to as "CESR") 42 (refer to FIG. 4) indicating a recoverable error state, or the like is disposed.

Figure 3:
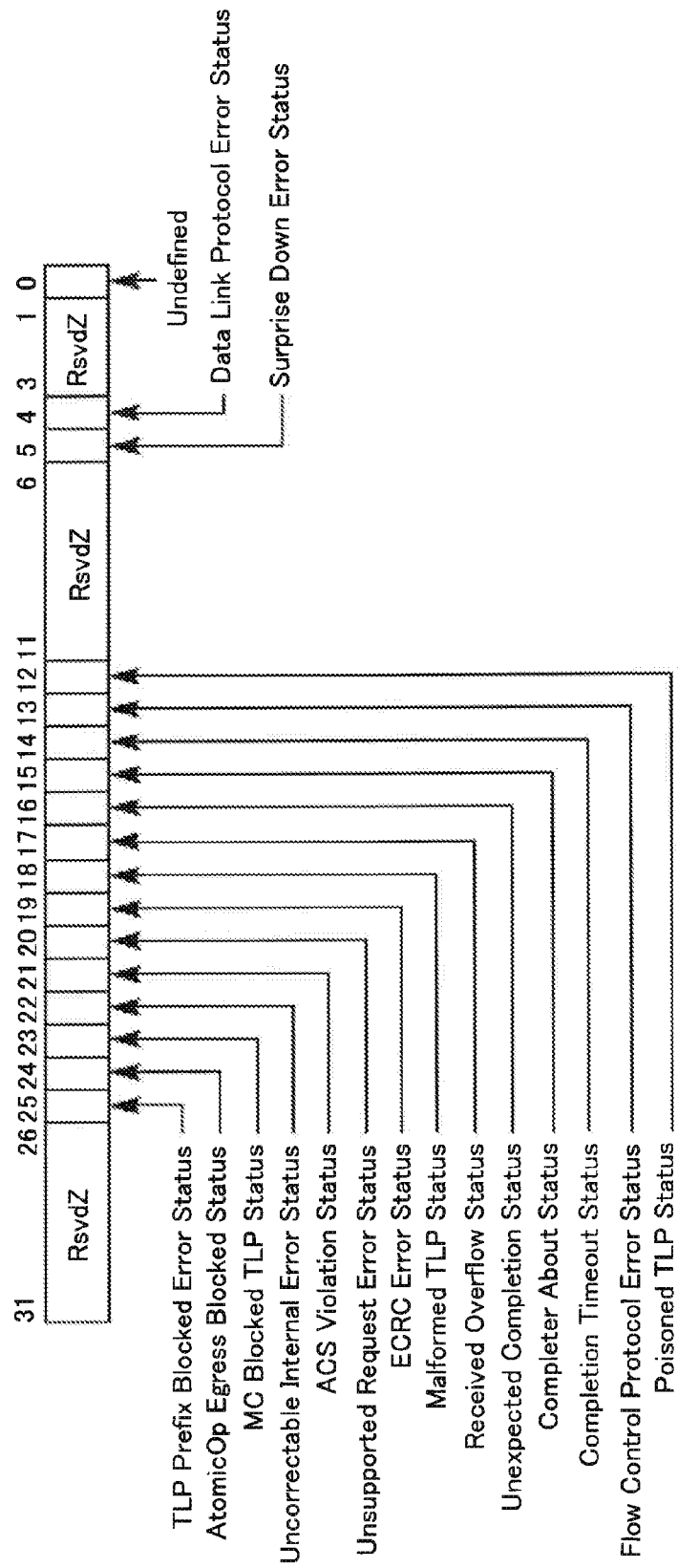
FIG. 3 is a view depicting an example of an unrecoverable error state register.
Figure 4:
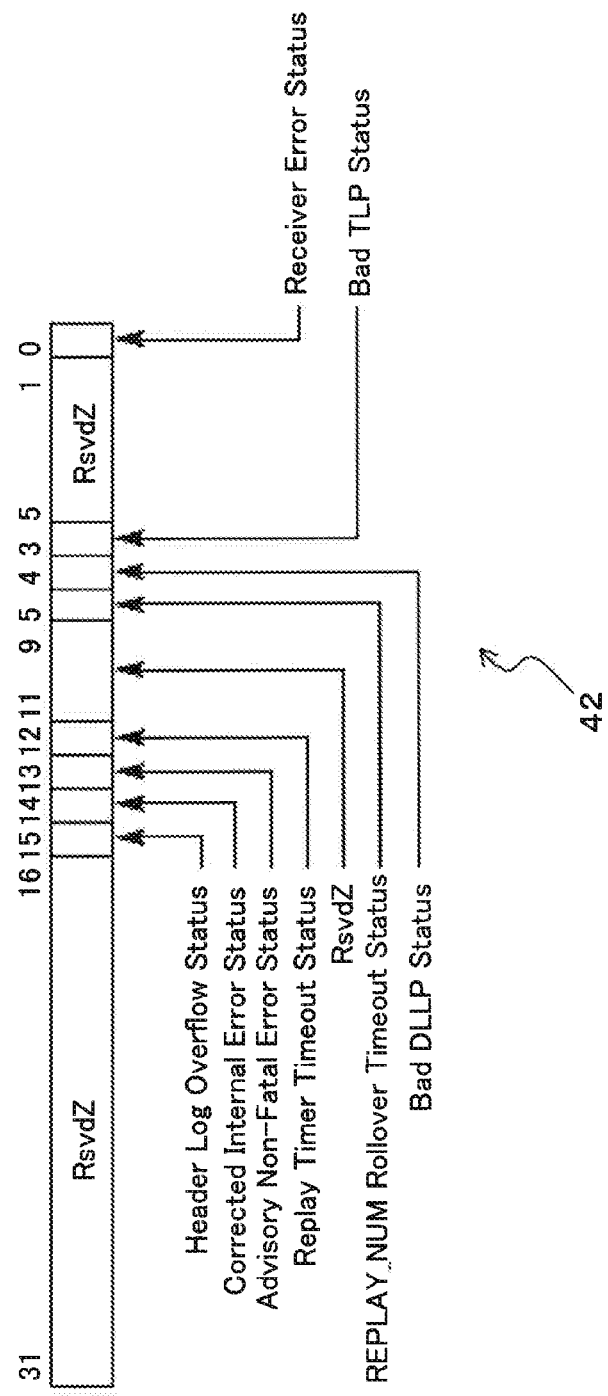
FIG. 4 is a view depicting an example of the recoverable error state register.

FIG. 3 is a view illustrating an example of the UESR 41, and FIG. 4 is a view illustrating an example of the CESR 42. The formats of the UESR 41 and the CESR 42 are defined by the standard of the PCIe.

FIG. 2 schematically depicts also part of the memory space 8 of the memory 3. The memory space 8 has an SMRAM 11, and an SMI handler 12 loaded from the BIOS9 exists in the SMRAM 11. The SMI handler 12 includes a fault location program (example of an error location specification program) 20. The fault location program 20 is executed by the CPU 2 to implement the fault location processing unit (an example of an error location specification apparatus) 13 as an example of the embodiment in the information processing apparatus 1.

FIG. 1 is a block diagram depicting a functional configuration of the fault location processing unit 13 in the information processing apparatus 1 as an example of the embodiment.

The fault location processing unit 13 in the present disclosure includes an SMI cause decision unit (an example of an interrupt decision unit) 21, a periodic SMI processing unit 22 and an error SMI processing unit (an example of an error location specification section) 26.

The SMI cause decision unit 21 decides whether a generation cause of the SMI is a periodic SMI or an SMI arising from an error of a PCI Express (hereinafter referred to as "PCIe") device. Thereupon, the SMI cause decision unit 21 refers to the register of the chip set to decide whether the generated SMI is a periodic SMI or an SMI arising from an error of a PCIe device.

For example, as described above, in the case of the I/O Hub (IOH) of Intel, by referring to the PCIe [10:0] Error Status of the Global Non-Fatal Error Status Register and the Global Fatal Error Status Register of Device=20, Function=2, Offset=1C0h and 1c4h, it is decided that an error has occurred in a PCIe configuration in which each root port of the PCIe in the chip set is a start point.

On the other hand, for example, in the case of the I/O Controller Hub10 (ICH10) of Intel, occurrence of a periodic SMI is decided from the PERIODIC_STS bit of the bit 14 of the SMI Status register of PMBASE+34h.

The SMI cause decision unit 21 calls, in the case of a periodic SMI, the periodic SMI processing unit 22, but calls, in the case of an error of a PCIe device, the error SMI processing unit 26.

When the generated SMI is a periodic SMI, the periodic SMI processing unit 22 reads out values of the CESRs 42 of all PCIe devices connected to the information processing apparatus 1 and saves the read out values into a CESR saving section 31 and then carries out clearing of the CESRs 42. The periodic SMI processing unit 22 includes a CESR readout processing unit 23, a CESR saving processing unit 24 and a CESR clearing processing unit 25.

The CESR readout processing unit 23 reads out values of the CESRs 42 of all PCIe devices connected to the information processing apparatus 1 for each periodic SMI.

The CESR saving processing unit 24 stores the values of the CESRs 42 of the devices read out by the CESR readout processing unit 23 into the CESR saving section 31 hereinafter described.

The CESR clearing processing unit 25 clears a recoverable error state set to each bit of the CESR 42. By clearing the recoverable error state, it becomes possible to grasp whether or not a recoverable error state has occurred again in the case of a periodic SMI after the clear.

The error SMI processing unit 26 reads out the UESR 41 upon generation of an error SMI and decides a link down. Then, the error SMI processing unit 26 reads the values of the CESRs saved in the CESR saving section 31 and refers to an analysis information storage unit 32 hereinafter described to specify a suspect location to point out an error.

The error SMI processing unit 26 includes a UESR readout processing unit 27, a link down detection processing unit 28, a link down suspect location specification processing unit 29, and an error pointing out processing unit 30.

The UESR readout processing unit 27 reads out the value of the UESR 41 of the PCIe device.

The link down detection processing unit 28 decides whether or not a link down occurs based on the UESRs read out by the UESR readout processing unit 27. For example, where the status bit 5 "Surprise Down Error Status" of the UESR 41 depicted in FIG. 3 is set to 1, it is decided that a link down occurs.

Where a link down occurs, the link down suspect location specification processing unit 29 counts the number of times of occurrence of a recoverable error state for each of suspect location candidates (upstream devices, downstream devices or transmission paths) for the link down and produces error detection count information 35 hereinafter described with reference to FIG. 9. At this time, the link down suspect location specification processing unit 29 uses values of the CESRs of the upstream devices and downstream devices at the link down occurrence location saved in the CESR saving section 31 and suspect classification definition information 34 of the analysis information storage unit 32 hereinafter described.

Here, among the devices connected to each other by the transmission path, a device on the side near to the CPU 2 (or the root port 17) is referred to as "upstream device" and another device which is connected to the upstream device by the transmission path and is on the side spaced away from the CPU 2 (or the root port 17) is referred to as "downstream device". For example, in a link between a root port 17 of the chip set 4 of FIG. 2 and a port 18 of a switch 14, the upstream device is the route port 17; the downstream device is the port 18; and the transmission path indicates the transmission path that connects the root port 17 and the port 18 to each other.

Figure 10:
FIG. 10 is a view depicting an example of suspect priority definition priority information as an example of the embodiment.
Figure 12:
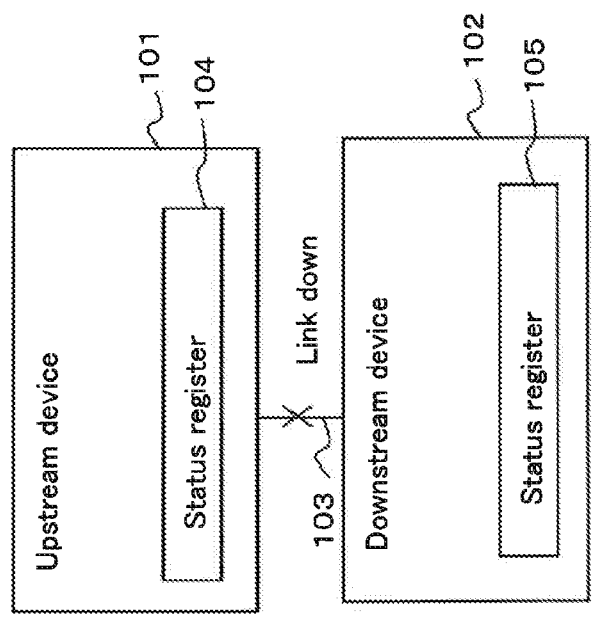
FIG. 12 is a view schematically depicting a state in which a link down occurs.

The link down suspect location specification processing unit 29 compares the count values of the suspect location candidates of the error detection count information 35 with each other. Then, if only one candidate has a maximum count value, this candidate is decided as a suspect location. On the other hand, if a plurality of candidates having a maximum count value are detected, then a candidate that has the highest priority rank in suspect priority definition information 36 hereinafter described with reference to FIG. 10 is specified as a suspect location.

Figure 9:
FIG. 9 is a view depicting an example of error detection count information as an example of the embodiment.

For example, in the example of the error detection count information 35 of FIG. 9, the error detection counts of both of the transmission path and the downstream device are "4". However, in the suspect priority definition information 36 of FIG. 10, the transmission path has a higher priority rank given thereto than that given to the downstream device. Therefore, the link down suspect location specification processing unit 29 decides that the transmission path is a suspect location.

Figure 7:
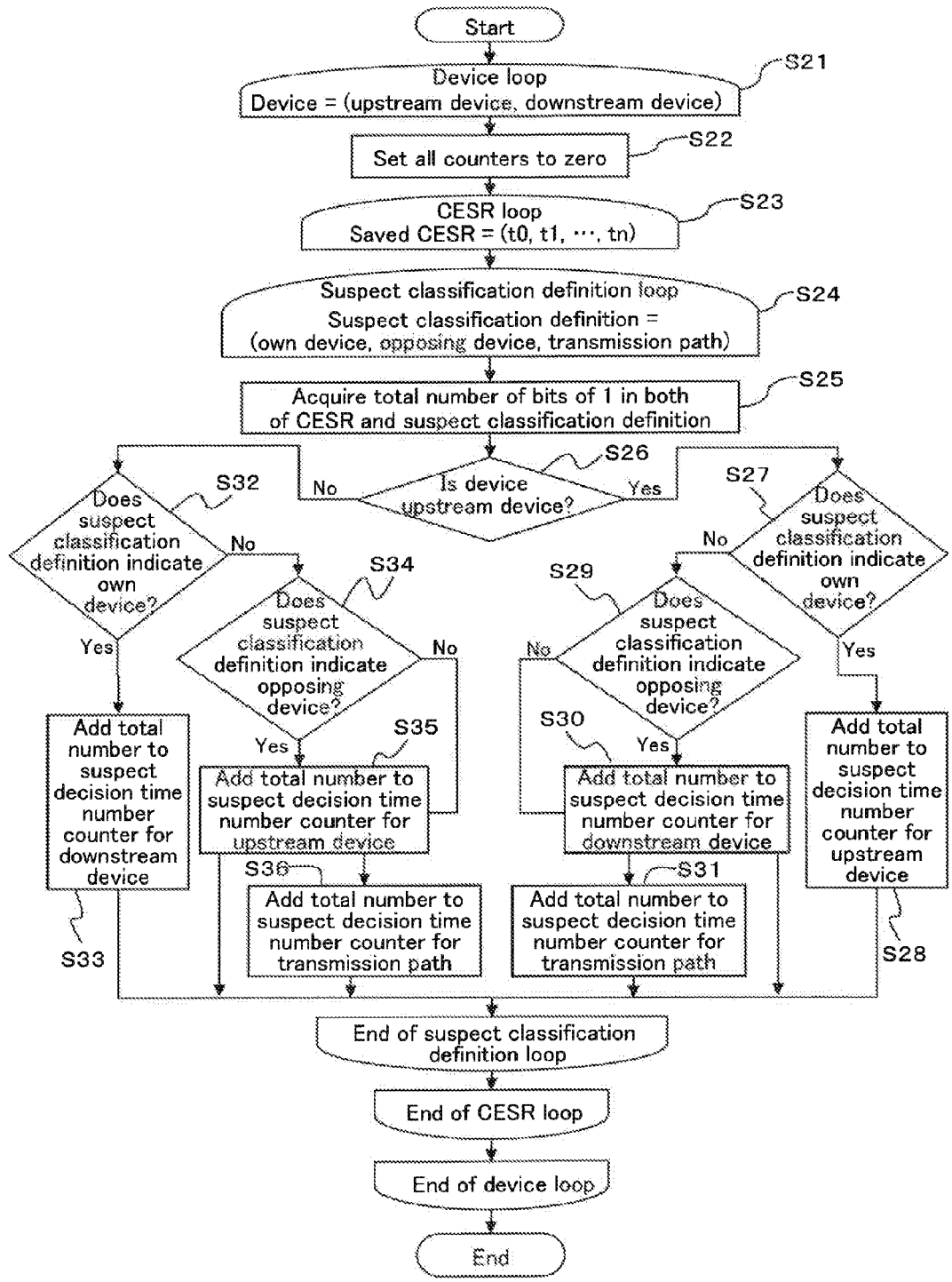
FIG. 7 is a flow chart illustrating an error detection count calculation process as an example of the embodiment.

It is to be noted that details of the processing of the link down suspect location specification processing unit 29 are hereinafter described with reference to FIG. 7.

The error pointing out processing unit 30 outputs the suspect location of the link down specified by the link down suspect location specification processing unit 29 to a display apparatus 38 based on error pointing out format information 37 hereinafter described.

Further, in the information processing apparatus 1 in FIG. 2, by executing the fault location program 20, the CESR saving section 31 (an example of an error storage section) and the analysis information storage unit 32 that are to be used by the fault location processing unit 13 are secured in a region of a data storage apparatus such as a memory or a hard disk (not depicted).

The CESR saving section 31 is a region in the data storage apparatus such as a memory such as the memory 3 depicted in FIG. 1 or a hard disk (not depicted), and values of the CESRs are saved as saving CESRs 43. The CESR saving section 31 stores the saving CESRs 43 of a plurality of generations t0, t1, t2, . . . , to (n is an integer equal to or higher than 2) of each of periodic SMIs therein for each of devices d1, d2, d3, . . . and dm (m is an integer equal to or higher than 2) of the PCIe.

For example, where saving CESRs 43 by three generations (n=3) are to be saved in response to a periodic SMI generated after every eight seconds, the saving CESRs 43 by three generations after eight seconds, sixteen seconds and twenty-four seconds after starting of a periodic SMI are stored into the CESR saving section 31. Thereafter, the saving CESRs 43 in the CESR saving section 31 are overwritten by new saving CESRs 43 in order beginning with the oldest CESR. In particular, in the example described above, the previously saved saving CESR 43 at a point of time of the eighth second is overwritten after thirty-two seconds, and therefore, the saving CESRs 43 of the latest three generations are saved. It is to be noted that a generation interval of a periodic SMI and the number (n) of generations of the saving CESR 43 to be stored can be suitably changed.

Also the analysis information storage unit 32 is a region in the data storage apparatus such as a memory such as the memory 3 depicted in FIG. 1, a hard disk (not depicted) or the like and stores information for analyzing and pointing out a saving CESR 43 as an error. The analysis information storage unit 32 includes suspect location analysis information 33 and the error pointing out format information 37 for defining a format of error pointing out.

The suspect location analysis information 33 includes the suspect classification definition information 34, error detection count information 35 and suspect priority definition information 36.

The suspect classification definition information 34 is used for associating an allocated state to each bit of a CESR and a suspect location candidate of a link down to each other, and is used for counting the number of times of error detection by the link down suspect location specification processing unit 29 hereinafter described with reference to FIG. 7.

The suspect classification definition information 34 is such bit sequences of 32 bits as depicted in FIGS. 8A to 8C. The suspect classification definition information 34 is used for decision about which one of three candidates including a device in which a recoverable error occurs (hereinafter referred to as "own device"), an opposite device to which the own device is connected by a PCIe link (hereinafter referred to as "opposing device") and a transmission path (PCIe link) is highest in possibility as the suspect candidate when a link down occurs. The suspect classification definition information 34 corresponds to each recoverable error allocated to each bit of the CESR 42.

For example, in the suspect classification definition of the own device of FIG. 8A, 1 is set to the bit 14. This corresponds to the status bit 14 "Corrected Internal Error Status" of the CESR 42 that indicates an error of the own device (refer to FIG. 3). If the bit 14 "Corrected Internal Error Status" is 1 as a result when logical ANDing is carried out between the suspect classification definition of the own device in which 1 is set to the status bit 14 and the saving CESR 43 before the link down occurs, then the device is a suspect location of the link down with a high degree of possibility.

Also in the suspect classification definition of the transmission path of FIG. 8B, 1 is set to the bit 12, 7, 6 or 0 similarly. This corresponds to the status bit 12 "Replay Timer Timeout Status", bit 7 "Bad DLLP Status", bit 6 "Bad TLP Status" and bit 0 "Receiver Error Status" of the CESR 42 that indicate an error of the transmission path (refer to FIG. 3). If one of the bits 12, 7, 6 and 0 is 1 as a result when logical ANDing is carried out between the suspect classification definition of the transmission path in which 1 is set to the status bit 12, 7, 6 or 0 and the saving CESR 43 before the link down occurs, then the transmission path is a suspect candidate for the link down with a high degree of possibility.

In the suspect classification definition of the opposing device of FIG. 8C, 1 is set to the bit 8. This corresponds to the status bit 8 "REPLAY_NUM Rollover Status" of the CESR 42 that indicates an error of the opposing device (a downstream device in the case of the CESR 42 of an upstream device, or an upstream device in the case of the CESR 42 of the downstream device) (refer to FIG. 3). If the bit 8 is 1 as a result when logical ANDing is carried out between the suspect classification definition of the opposing device in which 1 is set to the status bit 8 and the saving CESR 43 before the link down occurs, then the possibility is high that the opposing device is a suspect candidate for the link down with a high degree of possibility.

The error detection count information 35 indicates a number of times of an error occurring in the saving CESR 43 using the suspect classification definition information 34 with regard to the suspect location candidates (candidate locations) of the upstream device, transmission path and downstream device in the link down suspect location specification processing unit 29 hereinafter described with reference to FIG. 7. An example of the error detection count information 35 is depicted in FIG. 9.

The suspect priority definition information 36 defines a priority order or ranking among the suspect location candidates (upstream device, downstream device and transmission path), and is used for deciding, where a plurality of candidates having maximum and equal count values of the error detection count information 35 are detected, which suspect location candidate is to be determined as a suspect location. In the suspect priority definition information 36 in the example depicted in FIG. 10, a priority rank 3, another priority rank 1 and a further priority rank 2 are given to the upstream device, transmission path and downstream device, respectively. The priority order is determined, for example, based on a statistic analysis, experience or the like, and it is considered that a suspect location candidate having a lower priority rank is more doubtful.

For example, in the example of FIG. 9, since the number of times of occurrence both in the downstream device and the transmission path is four, it is decided that the transmission path whose priority rank is highest in the suspect priority definition information 36 depicted in FIG. 10 is a suspect location.

The display apparatus 38 is an outputting apparatus such as a liquid crystal display unit or a CRT built in or provided externally of the information processing apparatus 1. The information of the suspect location of the link down specified by the link down suspect location specification processing unit 29 is outputted to the display apparatus in accordance with the error pointing out format information 37.

The fault location processing unit 13, SMI cause decision unit 21, periodic SMI processing unit 22, error SMI processing unit 26, CESR readout processing unit 23, CESR saving processing unit 24, CESR clearing processing unit 25, UESR readout processing unit 27, link down detection processing unit 28, link down suspect location specification processing unit 29 and error pointing out processing unit 30 are implemented by the CPU 2 depicting in FIG. 2 executing the fault location program 20 or the like using the memory 3.

Further, the memory 3 of FIG. 2 may function as the CESR storage section 31 and the analysis information storage unit 32.

It is to be noted that a program for implementing the functions as the fault location processing unit 13, SMI cause decision unit 21, periodic SMI processing unit 22, error SMI processing unit 26, CESR readout processing unit 23, CESR saving processing unit 24, CESR clearing processing unit 25, UESR readout processing unit 27, link down detection processing unit 28, link down suspect location specification processing unit 29 and error pointing out processing unit 30 is provided in the form in which it is recorded in a computer-readable recording medium such as, for example, a flexible disk, a CD (CD-ROM, CD-R, CD-RW or the like), a DVD (DVD-ROM, DVD-RAM, DVD-R, DVD+R, DVD-RW, DVD+RW, HD DVD or the like), a Blu-ray disk, a magnetic disk, an optical disk, a magneto-optical disk or the like. The computer reads out the program from the recording medium and transfers and stores the read out program to and into an internal storage apparatus or an external storage apparatus and then uses the program. Further, the program may be recorded into a storage apparatus (recording medium) such as, for example, a magnetic disk, an optical disk or a magneto-optical disk such that it is provided from the storage apparatus to the computer through a communication path.

Figure 5:
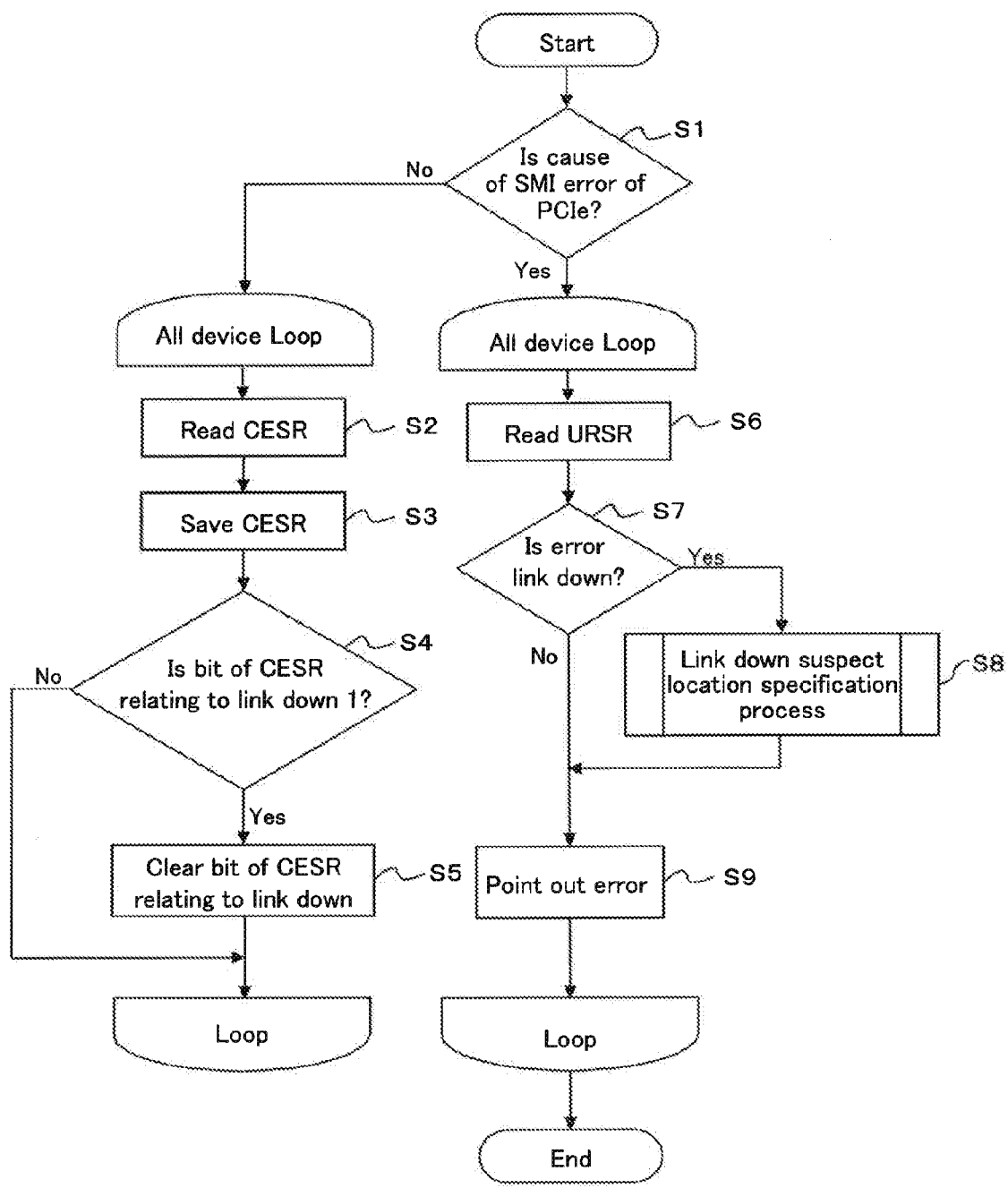
FIG. 5 is a flow chart illustrating a fault location process as an example of the embodiment.

Now, a fault location process (an example of an error location specification method) to be executed by the fault location processing unit 13 is described with reference to FIG. 5. FIG. 5 is a flow chart (steps S1 to S9) illustrating the fault location process as an example of the embodiment.

If a link down occurs, then the chip set 4 produces an error SMI and the fault location process is started by the fault location processing unit 13.

First, the SMI cause decision unit 21 of the fault location processing unit 13 decides whether an occurrence cause of the SMI is a periodic SMI or an SMI that arises from an error of a PCIe device (step S1).

For example, in the case of the I/O Hub (IOH) of Intel described above, the SMI cause decision unit 21 refers to the PCIe [10:0] Error Status of the Global Non-Fatal Error Status Register and the Global Fatal Error Status Register of Device=20, Function=2, Offset=1C0h and 1C4h and decides that an error has occurred in a PCIe configuration in which each root port of the PCIe in the chip set is a start point.

On the other hand, for example, in the case of the I/O Controller Hub10 (ICH10) of Intel, occurrence of a periodic SMI is decided from the PERIODIC_STS bit of the bit 14 of the SMI Status register of PMBASE+34h.

If the SMI is a periodic SMI (refer to the "No" route at step S1), then the periodic SMI processing unit 22 executes a process described below for all PCIe devices d1, d2, . . . and dm.

First, the periodic SMI processing unit 22 reads out a CESR of the PCIe device (step S2) and saves the read out CESR as the saving CESR 43 into the CESR saving section (step S3).

Then at step S3, the periodic SMI processing unit 22 decides whether or not one of the bits for a recoverable error state relating to the link down is set to 1. If one of the bits is set to 1 (refer to the "Yes" route at step S4), then the status bit is cleared (step S5).

It is to be noted that, in the present example, a register of a zero-clear configuration wherein, by setting 1 to a bit to which 1 is set, the bit is set to the clear (0) is used. Therefore, at step S5, by writing 1 to the bit set to 1, the status bit is cleared. However, also it is possible to use a register configuration other than the zero-clear configuration.

Further, for example, as the status bit of the CESR relating to a link down, the bit 0 "Receiver Error Status", bit 6 "Bad TLP Status", bit 7 "Bad DLLP Status", bit 8 "REPLAY_NUM. Rollover Status", bit 12 "Replay Timer Timeout Status" and bit 14 "Corrected Internal Error Status" of the CESR are used, and the bits are checked. Then, if any of the bits are 1, then 1 is written to the bit to clear the bit.

Thereafter, the processing by the periodic SMI processing unit 22 advances to a next device, and then the processes from step S2 to step S5 are repetitively carried out for the next device.

It is to be noted that, also when all of the bits are 0 at step S4 (refer to the "No" route at step S4), the processing by the periodic SMI processing unit 22 advances to a next device and the processes from step S2 to step S5 are repetitively carried out for the next device.

If the processes from step S2 to step S5 are completed for all of the devices, then the fault location process is ended.

On the other hand, if the SMI arises from an error of the PCIe (refer to the "Yes" route at step S1), then a process described below is executed for all of the PCIe devices.

First, the UESR readout processing unit 27 reads out the UESR 41 (step S6) and the link down detection processing unit 28 checks whether or not the status bit 5 "Surprise Down Error Status" of the UESR 41 is set to 1 to decide whether or not an error having occurred arises from a link down (step S7). For example, in the example described above, if the status bit 5 of the UESR 41 is set to 1 (refer to the "Yes" route at step S7), then the link down detection processing unit 28 decides that a link down has occurred.

Then, the link down suspect location specification processing unit 29 executes a link down suspect location specification process for deciding which one of the upstream device, downstream device and transmission path a suspect location of the link down is (step S8). Details of the process are hereinafter described with reference to FIG. 6.

Then, the error pointing out processing unit 30 outputs the suspect location of the link down specified by the link down suspect location specification process to the display apparatus 38 based on the error pointing out format information 37 (step S9).

If it is decided at step S6 that a link down has not occurred (refer to the "No" route at step S7), then the processing advances to step S9, at which the error pointing out processing unit 30 outputs an error notification to the display apparatus 38 based on the error pointing out format information 37.

After the error pointing out processing unit 30 points out an error at step S9, the processing advances to a next device, and the processes at steps S6 to S9 are repetitively carried out for the next device.

If the processes at steps S6 to S9 are completed for all of the devices d1, d2, . . . and dm, then the fault location process is ended.

Figure 6:
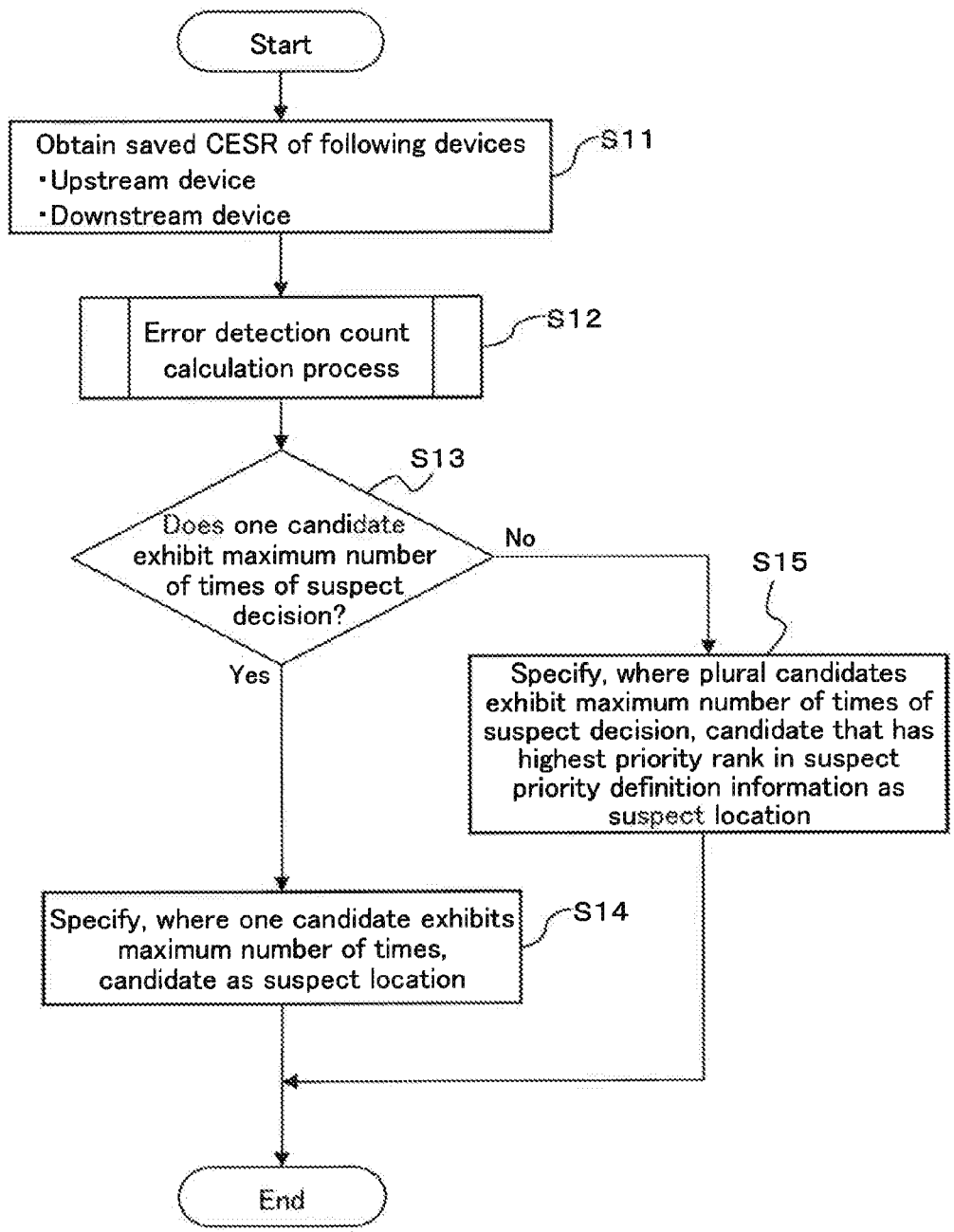
FIG. 6 is a flow chart illustrating a link down suspect location specification process as an example of the embodiment.

Now, the link down suspect location specification process by the link down suspect location specification processing unit 29 is described with reference to FIG. 6. FIG. 6 is a flow chart (steps S11 to S15) illustrating the link down suspect location specification process as an example of the embodiment.

First, the link down suspect location specification processing unit 29 acquires the saving CESRs 43 of the upstream device and the downstream device with respect to the link down occurrence location from the CESR saving section 31 (step S11).

Then, the link down suspect location specification processing unit 29 executes an error detection count calculation process using the values of the saving CESRs 43 acquired at step S11 and the suspect classification definition information 34 of the analysis information storage unit 32 (step S12). The error detection count calculation process is a process for counting the number of times of occurrence (error detection count information 35) of the recoverable error state in the saving CESR 43 of each of the upstream device and downstream device or the transmission path which is/are a suspect location candidate or candidates of the link down. The error detection count calculation process is hereinafter described with reference to FIG. 7.

Then, the link down suspect location specification processing unit 29 compares the count values between the suspect location candidates for the link down of the error detection count information 35 to decide whether or not the number of candidates having a maximum count value is one (step S13). If the number of candidates having a maximum count value is one (refer to the "Yes" route at step S13), then it is decided that this candidate is a suspect location (step S14), and then the link down suspect location specification process is ended.

On the other hand, if a plurality of candidates having a maximum count value are detected (refer to the "No" route at step S13), then the link down suspect location specification processing unit 29 applies the priority order of the suspect priority definition information 36 to the candidates and decides that a candidate having the highest priority rank is a suspect location (step S15). Then, the link down suspect location specification process is ended.

Now, the error detection count calculation process is described with reference to FIG. 7. FIG. 7 is a flow chart (steps S21 to S36) illustrating the error detection count calculation process as an example of the embodiment.

First, the link down suspect location specification processing unit 29 executes a loop process for upstream devices (step S21). In order to carry out decision regarding the upstream devices ud1 to ud1 (1 is an integer equal to or higher than 2), the loop process is carried out successively taking the upstream devices ud1 to ud1 as a decision target.

First, the link down suspect location specification processing unit 29 sets a counter for counting the suspect definition time number for upstream devices, another counter for counting the suspect definition time number for downstream devices and a further counter for counting the suspect definition time number for the transmission path to 0 (step S22).

Then, in order to carry out decision for the saving CESRs 43 for the saved generations t0, t1, . . . and tn of a device of a decision target, the link down suspect location specification processing unit 29 successively takes the saving CESRs 43 t0, t1, . . . and tn as the decision target. An initial value 1 is set to a counter value i, and the saving CESR 43 ti (i=1 to n−1) is read out from the CESR saving section 31 at step S23.

Then, at step S24, the link down suspect location specification processing unit 29 executes a suspect classification definition loop and further executes a process described below for each case in which the suspect classification definition is the own device, opposing device and transmission path.

If the suspect classification definition is the "own device", then the link down suspect location specification processing unit 29 reads the bit sequence of FIG. 8A described hereinabove. If the suspect classification definition is the "transmission path", then the bit sequence of FIG. 8B is read. If the suspect classification definition is the "opposing device", then the bit sequence of FIG. 8C is read.

Then, the link down suspect location specification processing unit 29 compares (logically ANDS) the saving CESR 43 ti read out at step S23 and the bit sequence read out at step S24 with each other to calculate the total number of bits which are 1 between both of the saving CESR 43 ti and the bit sequence (step S25).

Then, the link down suspect location specification processing unit 29 decides whether the device of the decision target is an upstream device or a downstream device (step S26).

If the device of the decision target is an upstream device (refer to the "Yes" route at step S26), then the link down suspect location specification processing unit 29 decides whether or not the suspect classification definition read out at step S24 is the own device (step S27). If the suspect classification definition is the own device (refer to the "Yes" route at step S27), then the total number of bits calculated at step S25 is added to a counted value of the suspect decision time number counter for the upstream device (step S28).

Further, if the suspect classification definition read out at step S24 is not the own device at step S27 (refer to the "No" route at step S27), then the link down suspect location specification processing unit 29 subsequently decides whether or not the suspect classification definition is the opposing device (step S29). If the suspect classification definition is the opposing device (refer to the "Yes" route at step S29), then the total number of bits calculated at step S25 is added to the suspect decision time number (counter) for the downstream devices (step S30). Then, the processing advances to a next suspect classification.

On the other hand, if the suspect classification definition is not the opposing device at step S29 (refer to the "No" route at step S29), then the link down suspect location specification processing unit 29 adds the total number of bits calculated at step S25 to the counted value of the suspect decision time number counter for the transmission path (step S31).

On the other hand, if the target device is not the upstream device at step S26 (refer to the "No" route at step S26), then the link down suspect location specification processing unit 29 decides whether or not the suspect classification definition read out at step S24 is the own device (step S32). If the suspect classification definition is the own device (refer to the "Yes" route at step S32), then the total number of bits calculated at step S25 is added to the counted value of the suspect decision time number for the downstream devices (step S33). Then, the processing advances to a next suspect classification.

On the other hand, if the suspect classification definition read out at step S24 is not the own device (refer to the "No" route at step S32), then the link down suspect location specification processing unit 29 decides whether or not the suspect classification definition is the opposing device (step S34). If the suspect classification definition is the opposing device (refer to the "Yes" route at step S34), then the total number of bits calculated at step S25 is added to the counted value of the suspect decision time number counter of the upstream device (step S35). Then, the processing advances to a next suspect classification.

On the other hand, if the suspect classification definition is not the opposing device at step S34 (refer to the "No" route at step S34), then the link down suspect location specification processing unit 29 adds the total number of the bits calculated at step S25 to the counted value of the suspect decision time number counter of the transmission path (step S36). Then, the processing advances to a next suspect classification.

If the processes at steps S25 to S36 are completed for the suspect classification definitions for the own device, opposing device and transmission path, then the processing advances to step S23, and the link down suspect location specification processing unit 29 reads out the next saving CESR 43 (step S23). Thereafter, the processes at steps S24 to S36 are carried out repetitively.

If the processes at steps S23 to S36 are completed for all of the saving CESRs 43, then the processing advances to step S21 and the processes described above are executed also for the downstream devices ld1 to ldl (l=an integer equal to or higher than 2).

By repetitively carrying out the calculation as described above, the error detection count information 35 depicted in FIG. 9 is calculated.

FIG. 11 illustrates an example of an error pointing out, and errors are pointed out with priority ranks. In the example of FIG. 11, a case is illustrated in which the upstream device is the port 1 (hereinafter referred to as "SW0-P1") of a PCIe switch 0 and the downstream device is the port 0 (hereinafter referred to as "SW1-P0") of another PCIe switch 1. In the present example, the transmission path of the PCIe between the SW0-P1 and the SW1-P0 has the highest priority rank as a suspect location candidate; a suspect location candidate having the second highest priority rank is the PCIe port of the SW1-P0 of the downstream device; and a suspect location candidate having the lowest priority rank is the PCIe port of the SW0-P1.

Also a time stamp, an error type and error contents are pointed out together with the information described above. It is to be noted that the pointed out information is a mere example and can be changed suitably.

The error location specification method, error location specification apparatus and error location specification program according to the example of the embodiment described above exhibit the following effects.

(1) Since a suspect location can be specified together with a priority rank when an error of a link down of the information processing apparatus 1 occurs, also a worker who does not have special information very much can grasp a fault location in short time and can deal with the problem suitably. Therefore, training time for the worker can be reduced and the operation cost for the system of the information processing apparatus 1 can be reduced. Further, since a countermeasure against a fault can be taken quickly, the availability of the system can be enhanced.

(2) Further, since the saving CESR 43 is used for an error analysis when an error of a link down of the information processing apparatus 1 occurs, it is not necessary to connect an inspection apparatus to the information processing apparatus while the information processing apparatus 1 is operative. Therefore, a countermeasure against a fault can be taken at any time without having an influence on operation of the information processing apparatus 1.

(3) Furthermore, since the necessity for an inspection apparatus for exclusive use is eliminated and an appropriate candidate can be specified as a suspect location, a faulty part can be exchanged suitably. Therefore, the maintenance cost for the system can be reduced.

Although the embodiment of the present disclosure has been described, the technology of the present disclosure is not limited to the embodiment described above and variations and modifications can be made without departing from the subject matter of the present disclosure.

For example, while, in the embodiment described above, one suspect location having the highest priority rank is specified and pointed out as an error, also it is possible to point out a plurality of suspect locations with priority ranks.

In the example of the embodiment described above, the present method is carried out in a PCI express-connected apparatus. However, for example, the present disclosure can be applied also to different connection topologies that cannot specify a suspect location of a link error. For example, the present disclosure can be applied also to an apparatus having other connections in which connection points are connected one by one and a plurality of devices are connected by a switch and besides a status register is provided at each connection point.

Further, in place of causing a suspect location or the like to be displayed on the display apparatus 38, a printing machine such as a printer or a sound outputting apparatus such as a speaker is provided such that a suspect location or the like is outputted using the apparatus.

With the technology of the present disclosure, when an error of a link down of the information processing apparatus occurs, since a suspect location can be specified with a priority rank, also an operator who does not have much special information can grasp and suitably deal with a faulty location in short time.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:
1. A method of determining an error location by an information processing apparatus that includes a plurality of devices connected to each other through a transmission path, comprising:
deciding, when an interrupt is generated, whether the interrupt is a periodic interrupt or an error interrupt;
storing, when the generated interrupt is a periodic interrupt, first error history information of each of the devices; and analyzing, when the generated interrupt is an error interrupt, second error history information of the devices to determine a suspect location of an error indicated by the error interrupt.

2. The method according to claim 1, wherein the first error history information that is stored when the generated interrupt is a periodic interrupt indicates a presence of a recoverable error while the second error history information that is analyzed when the generated interrupt is an error interrupt indicates a presence of an unrecoverable error.

3. The method according to claim 2, wherein, in the analysis of the second error history information, the number of times of occurrence of a recoverable error for each location at which there is the possibility that an error may occur is counted for each of the devices, and a location at which a maximum counted value is exhibited is determined as the suspect location.

4. The method according to claim 3, wherein, where a plurality of candidates for the suspect location at which a maximum counted value is exhibited are found, a suspect location is selected in accordance with a predetermined priority order.

5. The method according to claim 1, wherein the error is pointed out in a format defined in advance.

6. An error location determination apparatus for an information processing apparatus that includes a plurality of devices connected to each other through a transmission path, the error location determination apparatus includes a processor,
wherein the processor executing a process comprising:
deciding, when an interrupt is generated, whether the interrupt is a periodic interrupt or an error interrupt;
storing, when the generated interrupt is a periodic interrupt, first error history information of each of the devices; and
analyzing, when the generated interrupt is an error interrupt, second error history information of the devices to determine a suspect location of an error indicated by the error interrupt.

7. The error location determination apparatus according to claim 6, wherein the first error history information that is stored when the generated interrupt is a periodic interrupt indicates a presence of a recoverable error while the second error history information that is analyzed when the generated interrupt is an error interrupt indicates a presence of an unrecoverable error.

8. The error location determination apparatus according to claim 7, wherein the process further comprises counting the number of times of occurrence of a recoverable error that occurs in each of the devices and determining a location at which a maximum counted value is exhibited as the suspect location.

9. The error location determination apparatus according to claim 8, wherein, where a plurality of candidates for the suspect location at which a maximum counted value is exhibited are found, the process further comprises selecting a suspect location in accordance with a predetermined priority order.

10. The error location determination apparatus according to claim 6, wherein the process further comprises pointing out a cause of the error, and pointing out the error in a format defined in advance.

11. The error location determination apparatus according to claim 6, wherein each of the devices is a device of Peripheral Component Interconnect Express.

12. The error location determination apparatus according to claim 6, wherein the suspect location of the error is one of an upstream device, a downstream device and the transmission path.

13. A non-transitory computer-readable recording medium in which an error location determination program for an information processing apparatus that includes a plurality of devices connected to each other through a transmission path is recorded, the error location determination program causing a computer to execute a process for determining an error location, the process comprising:
deciding, when an interrupt is generated, whether the interrupt is a periodic interrupt or an error interrupt;
storing, when the generated interrupt is a periodic interrupt, first error history information of each of the devices; and
analyzing, when the generated interrupt is an error interrupt, second error history information of the devices to determine a suspect location of an error indicated by the error interrupt.

14. The non-transitory computer-readable recording medium in which the error location determination program is recorded according to claim 13, wherein the first error history information that is stored when the generated interrupt is a periodic interrupt indicates a presence of a recoverable error while the second error history information that is analyzed when the generated interrupt is an error interrupt indicates a presence of an unrecoverable error.

15. The non-transitory computer-readable recording medium in which the error location determination program is recorded according to claim 14, wherein the process further comprises counting the number of times of occurrence of a recoverable error that occurs in each of the devices and determining a location at which a maximum counted value is exhibited as the suspect location.

16. The non-transitory computer-readable recording medium in which the error location determination program is recorded according to claim 15, wherein the process further comprises, where a plurality of candidates for the suspect location at which a maximum counted value is exhibited are found, selecting a suspect location in accordance with a predetermined priority order.

17. The non-transitory computer-readable recording medium in which the error location determination program is recorded according to claim 13, wherein the process further comprises pointing out a cause of the error; and pointing out the error in a format defined in advance.

* * * * *